Jan. 27, 1970 H. I. GLASER 3,492,104
APPARATUS FOR MAKING GLASS FIBERS
Filed Feb. 14, 1967 2 Sheets-Sheet 1

INVENTOR.
HELLMUT I. GLASER
BY
*Staelin & Overman*
ATTORNEYS

Jan. 27, 1970    H. I. GLASER    3,492,104
APPARATUS FOR MAKING GLASS FIBERS
Filed Feb. 14, 1967    2 Sheets-Sheet 2

INVENTOR.
HELLMUT I. GLASER
BY Staelin + Overman
ATTORNEYS 3,492,104
APPARATUS FOR MAKING GLASS FIBERS
Hellmut I. Glaser, Newark, Ohio, assignor to Owens-Corning Fiberglas Corporation, a corporation of Delaware
Filed Feb. 14, 1967, Ser. No. 616,051
Int. Cl. C03b 37/08
U.S. Cl. 65—11                                         19 Claims

ABSTRACT OF THE DISCLOSURE

Stream feeder or bushing apparatus is disclosed herein for providing increased fiberforming capacity at a single station having side wall means converging toward each other from an increased tip forming area on a bottom wall to prevent stagnant glass pockets and eddy current disturbances. Heating and mechanical flow guiding means in the upper portion of the feeder establish substantially equal glass flow directly above the fiber-forming orifices to obtain fiber diameters that are uniform across the bottom wall orifice area.

---

Several methods have heretofore been employed in processing glass for forming attenuated filaments or fibers. One method involves the steps of melting glass in a comparatively large furnace, refining the glass in a refining chamber, and forming the glass into spherical bodies or marbles. The glass marbles are subsequently delivered into a stream feeder or bushing which is electrically heated to remelt the glass to a viscosity at which the streams of glass are flowed through orifices in the bushing and the glass of the streams attenuated into filaments by winding a strand of the filaments on a rotating collector. This method is costly as it involves special apparatus for handling and feeding the glass marbles and requires large amounts of electric energy in remelting the marbles.

Recent developments have been made wherein glass batch is reduced to a molten state and refined in a furnace and the molten glass flowed through a forehearth channel to stream feeders or bushings disposed along the forehearth and the streams of the glass delivered through orifices in the feeders or bushings and attenuated to filaments by winding a strand of the filaments upon a rotating collector. The latter process is referred to as a direct melt process. In the direct melt process in the melting and refining of the glass by the application of heat, the temperature of the molten glass is brought to a temperature that is comparatively high in order to effect refining of the glass. During this processing of melting and refining the glass, gases and volatiles are emitted or driven off from the melt. This action of melting and refining the glass at elevated temperatures renders the glass substantially stable for any temperature less than the maximum melt temperature in the furnace. Heretofore, in the direct melt process, the temperatures of the glass in the forehearth channel and the stream feeders or bushings are substantially lower than the temperature of the melt in the furnace. Thermal, physical and chemical inhomogeneities tend to occur in the transport of the glass in the forehearth channels through heat losses at the refractory sides, contact with the sides tending to contaminate the glass with refractory cords. Frequent filament breakouts, formation of nonuniform filaments and other difficulties have been encountered which are believed to be attributable at least in part to such inhomogeneities in bushings or stream feeders disposed along a forehearth and supplied with glass from the forehearth channel. In stream feeders or bushings conventionally used along a forehearth channel, temperature upsets and inhomogeneities of the glass cannot adequately be corrected or abated in a comparatively short time that the glass is resident in the feeder or bushing. To overcome this problem a comparatively deeper bushing or feeder has been used and the glass in the feeder or bushing has been reheated to a temperature approaching but not exceeding the maximum original melt temperature to recondition the glass.

Heretofore, in the direct melt process being discussed the glass was flowed from a forehearth into each bushing through a substantially large rectangularly-shaped open area usually of substantially the same area as the cross-sectional area of the bushing or stream feeder receiving the glass. However, with the reheating of the glass in the stream feeder or bushing and with the connection of several such bushings along the length of the forehearth, difficulties have been encountered in endeavors to stabilize the thermal characteristics of the glass in the several bushings. Variations in the temperature of the glass in the forehearth are transferred to the bushings or stream feeders by reason of the large area of open flow passage into each bushing, a condition referred to as "thermal cross-talk."

Thus temperature upsets of the glass in the forehearth are transmitted to the bushings and thermal differences in the bushings are readily transferred to adjacent bushings through the glass in the forehearth channel. For example, if one bushing becomes inoperative or is taken out of service, the temperature of the glass in the forehearth is affected thereby. Radiant energy from the glass in one bushing interacts on other bushings. Each bushing is under the influence of radiant energy from the glass in the forehearth and temperature variations in the forehearth sets up thermal interference in the bushings. In the improved version of the direct melt process the forehearth channel and each of the bushings constitutes separate thermal environments or systems which should be kept comparatively as isolated as possible. Each bushing is under the influence of radiant energy from the glass in the forehearth and temperature variations in the forehearth set up thermal interference of the bushings and vice versa.

In the glass processing system of this character, variations in viscosity and other characteristics of the glass on several bushings results in nonuniform streams flowing from the bushings, and filaments or fibers attenuated from the streams are not uniform in size and have varying strength characteristics. Where the system is employed for producing fine filaments for textile uses, it is imperative that the filaments from the several bushings be of uniform size for the production of commercially accepted textiles.

Efforts have been made to solve this latter problem by providing a restricted flow passage between the forehearth channel and the stream feeder or bushing. This has substantially reduced thermal interference or interaction between adjacent bushings and/or the forehearth channel to more nearly stabilize the operating characteristics of each bushing. However, this reduction of the thermal interaction problem has given rise to new requirements in bushings.

In using prior art bushings which as a standard have bottom walls with orifice means formed therein and having a larger bottom wall area than the restricted flow passage, the sides of the bushings have commonly extended vertically from the bottom wall or even diverged away from each other as they extend upwards. Stagnant pockets of glass occur in the upper corners which are heated over a long period and lose desirable characteristics. Flow problems in the standard bushings cause eddy currents and other disturbances in the thermal characteristics of the glass in the bushing and have made them less desirable for use in the applications discussed above. Since the restricted flow passage is smaller than the top opening of the bushing, erosion of the edges of the refractory forming the flow passage occurs causing the glass to have undesirable characteristics. Air must be properly pushed out of the bushing when it is first being filled with molten glass so that it does not interfere with the processing of the glass. In past bushings the air may become trapped in a pocket and either cause undesirable local thermal pockets which disturb the uniformity of the temperature in the bushing or tend to leak out of the air pockets in small bubbles which again causes nonuniformities and local thermal disturbances. Further, the flow characteristics of the molten glass from the forehearth through the restricted flow passage down the bushing to the orificed bottom wall is such that unequal velocity gradients occur horizontally across the bushing resulting in nonuniform characteristics of the glass adjacent the bottom wall and thus affecting the uniformity of the filaments or fibers and the strength characteristics thereof.

In addition to the special uses of bushings with the restricted flow passages as discussed above, it is desirable to increase the number of filaments that may be drawn from any bushing or feeder station. Engineering experience with the construction of bushings or stream feeders to date has indicated that there is a limitation on the number of orifices or orificed tips that may be formed in a unit area. Therefore, if it is desired to increase the production from a single feeder station it is necessary to enlarge the bottom wall or the tip section area of a feeder. Presently, forehearths have been designed in limited widths or sizes for the most efficient heating and conditioning. Therefore, even if other methods obtain for restricting thermal interaction between the forehearth channel and the bushing so that the flow passage between the channel of the forehearth and the bushing need not be restricted, the width of the forehearth channel itself becomes a limiting factor. Thus, if it were desired to increase production of a feeder station, the flow passage between the forehearth channel and the bushing would still be restricted in that the width or cross-sectional dimensions of the flow passage would be less than that of the tip section or bottom wall of the bushing. Then the problems discussed hereinbefore with respect to a restricted flow passage would be equally applicable.

Accordingly, it is an object of this invention to provide an improved method and apparatus for processing heat-softenable material.

It is another object of this invention to provide an improved method and apparatus for processing heat-softenable material in which the production from a single feeder station may be increased without affecting the quality of the filaments or fibers produced from that station.

It is still another object of this invention to provide an improved method and apparatus for processing heat-softenable material in which glass is flowed through a relatively restricted opening, is conditioned and is provided with substantially equal velocity gradients horizontal to and just above the tip section in order to improve the quality of the fibers formed therefrom.

A further object of this invention is to provide an improved stream feeder or bushing means which eliminates stagnant and eddy current areas, maintains a substantially equal velocity gradient horizontally above the tip section, provides for the escape of trapped air upon start up without disrupting the thermal characteristics of the bushing, and prevents erosion of a flow passage connecting the stream feeder with a forehearth channel.

In accordance with the above objects the invention features a stream feeder adapted to be used adjacent the flow passage formed in a channel means for containing a supply of heat-softened glass, the stream feeder having a bottom wall with orifices formed therein through which streams of material are discharged. The bottom wall has an area in excess of the area defined by the flow passage. Wall means extend upwardly from the bottom wall and have upper portions that converge towards each other at an angle to define a top opening for the stream feeder which has substantially the same dimensions as a bottom opening of the flow passage. Means are advantageously included in the feeder and spaced from the bottom wall thereof for heat treating the glass to condition the glass and to control the viscosity of the glass to provide a substantially horizontal equal velocity gradient line above the bottom wall. The spaced means may comprise a heater screen having perforations formed therein to guide air flow out of said feeder as it fills with glass and to guide glass flow in the feeder after filling.

In a preferred embodiment the bottom wall may be rectangular and the wall means may include end walls extending vertically upward and side walls that converge toward each other to define the top opening. The side walls may have lower portions that converge and upper portions with a greater degree of convergence to provide a larger capacity for the feeder. The sidewalls may have lower portions that extend vertically and upper portions that converge towards each other. In order to further increase the capacity and thus enable a longer residence time for the glass in the feeder the sidewalls may have lower portions that diverge away from each other and upper portions connected to said lower portions that converge towards each other to eventually define the top opening. Alternatively, the lower portions may vertically extend upwards for a given distance before joining with upper portions that converge towards each other. In an additional embodiment the bottom wall may be rectangular and the wall means may include end walls and sidewalls which both converge toward the top opening. When used herein the word rectangular is generic and it is meant to include square bottom walls as well as bottom walls which have a greater dimension of length than width. In a still further embodiment the bottom wall may be circular and the wall means may include an upper conical portion which converges toward the top opening. In this embodiment the wall means may include a lower portion that extends vertically upward from the bottom wall and joins with the conical upper portion. In a still further embodiment the bottom wall may be rectangular and be divided into a plurality of orifice carrying areas, the bottom wall being adapted to receive mechanical support between the orifice carrying areas to prevent sagging.

Further, in accordance with the above objects the invention embraces means having a channel containing a supply of heat-softened glass, a stream feeder disposed adjacent said supply means, a member disposed adjacent the stream feeder providing a floor portion of the supply means. The floor portion member may have a restricted flow passage with bottom and side edges through which glass flows from the channel so that the member may act as a thermal mask to retard heat transfer between the stream feeder and the channel. The stream feeder has side walls and a bottom wall with orifices formed in the bottom wall through which streams of material are discharged. The bottom wall is wider than the restricted flow passage and the side walls converge from the bottom wall to the bottom side edges of the restricted flow passage to define the top opening for the feeder which has substantially the same width dimension as the flow passage. The flow passage is of a size having a glass flow capacity substantially equal to but not less than the glass flow capacity of the orifices in the bottom wall of the feeder.

The invention further embraces the method of processing heat-softened glass which includes flowing the glass along a forehearth channel for delivery into a stream feeder arranged along the forehearth, forming a restricted flow passage between the forehearth channel and the stream feeder to impede transfer of heat energy between the channel and the feeder, forming an orifice carrying bottom wall of the feeder larger than the restricted flow passage and converging sidewalls of the feeder toward each other from the bottom wall to define a top opening of substantially the same size as the restricted flow passage to enable a release of air from the feeder as it fills with glass without disrupting the conditioning of the glass and to preclude the establishment of disruptive eddy currents and stagnant pockets of glass in the feeder. The method may further include heating the glass in the feeder to further condition the glass and include establishing substantially equal velociety gradient lines in the glass and the feeder before the glass reaches the bottom wall. The equal velocity establishing step may be accomplished by selectively heating the glass in the feeder and/or by mechanically or otherwise diverting the flow lines of the glass in the feeder.

Other objects, features and advantages will become more apparent when the following description is taken in conjunction with the accompanying drawings, in which.

While the method and apparatus of the invention have particular utility in the processing of mineral fibers, such as glass, for forming fibers or filaments from streams of glass, it is to be understood that the method and apparatus of this invention may be employed wherever it may be found to have utility.

Figure 1:
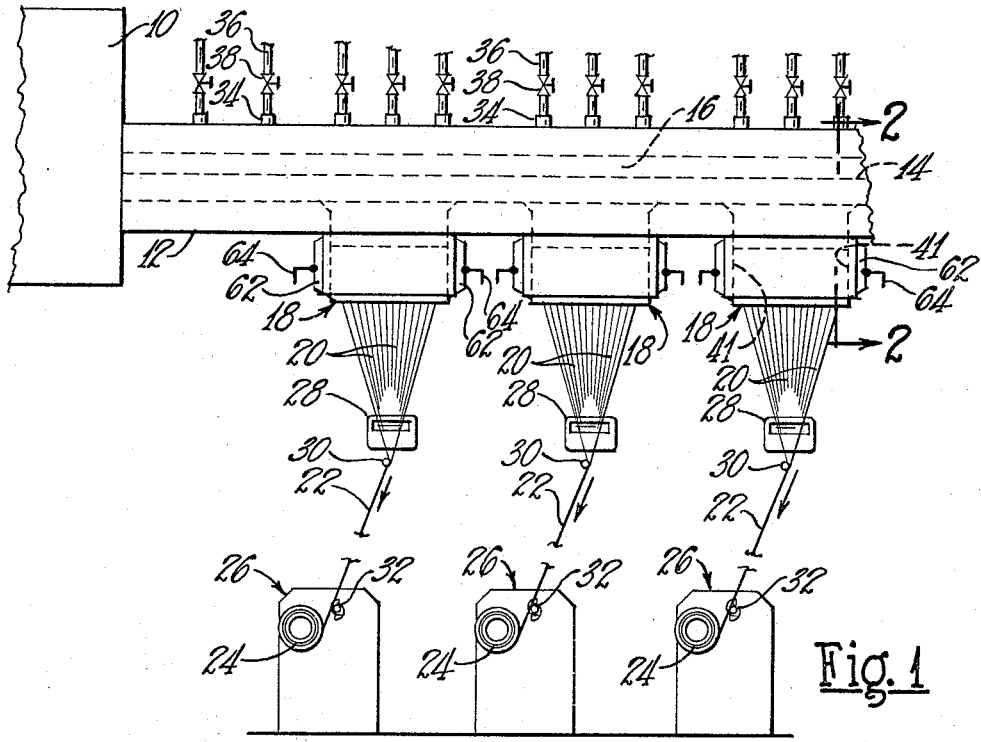
FIGURE 1 is a semi-schematic elevational view of a forehearth and bushing arrangement for carrying out the method of this invention.

Referring to the drawings in detail FIGURE 1 is a semi-schematic elevational view illustrating a forehearth construction of a direct melt system for supplying heat-softened glass to a plurality of stream feeders or bushings associated with the forehearth. The glass batch is introduced into a melting and refining furnace or tank 10 at an end region of the furnace opposite the forehearth 12 which is connected with the melting and refining furnace.

The glass batch is reduced to a flowable or molten condition in the furnace 10 and the molten glass is traversed through the furnace 10 to effect a refining of the glass whereby refined glass 14 is delivered from the furnace into the forehearth channel 16 lengthwise of the forehearth. The glass is processed to render it suitable for attenuation into filaments or fibers. Spaced lengthwise along the forehearth 12 are stream feeders or bushings 18.

The floor or tip section of each feeder or bushing is provided with orifice means through which flow streams of glass attenuated into filaments 20 by winding a strand 22 of the filaments upon a rotating collector 24 of a winding machine 26 of conventional construction, there being a winding apparatus for the filaments derived from each feeder.

The streams may be attenuated into fibers or filaments by other attenuating methods. An applicator 28 may be provided for each group of filaments for delivering binder or coating material onto each group of filaments. The filaments of each group are converged into a strand by gathering shoe 30. During winding of the strand on a collector 24 a rotatable and reciprocable traverse means 32 engages the strand for distributing the strand lengthwise on a collector 24 to form a package. During winding, the rotation of the traverse 32 oscillates the strand 22 to cause the individual wraps or convolutions of strand to be collected on the collector in crossing relation in a conventional manner.

The glass in the forehearth is maintained in a flowable condition by applying heat by means of burners 34 disposed in the roof of the forehearth 12, the burners being supplied with fuel gas and air mixture through tubular means 36 connected with a mixture supply, a valve means 38 being associated with each burner construction for regulating the delivery of fuel and air mixture to the burner. The burners are preferably of the radiant type but may be of any suitable character for establishing heat in the forehearth channel 16 to control the temperature of the glass 14 in the forehearth channel.

Figure 2:
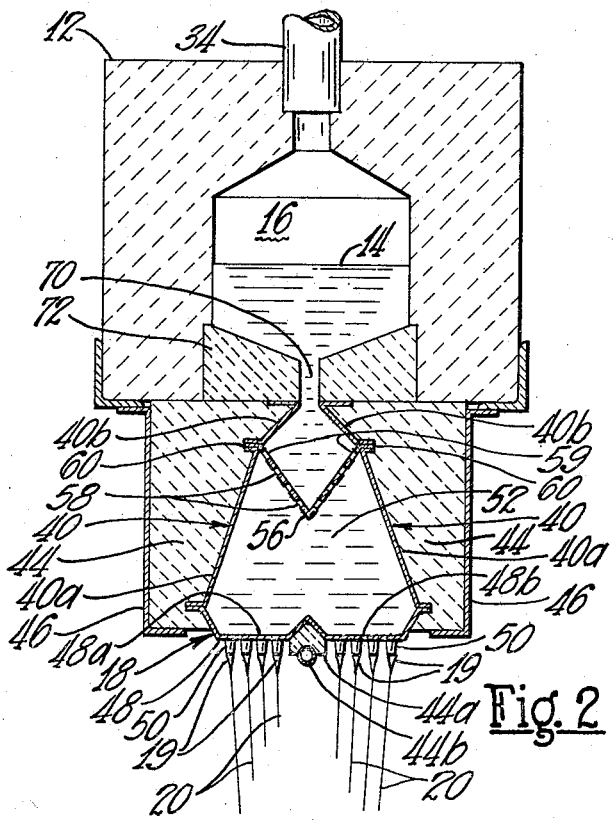
FIGURE 2 is a vertical sectional view taken substantially on the line 2—2 of FIGURE 1 illustrating a structural arrangement of the invention.

As illustrated in a preferred embodiment in FIGURE 2, each bushing 18 is inclusive of a bottom wall 48 having orificed tip means 50 formed therein, side walls 40 and end walls 41. The bushing is preferably fashioned of an alloy of platinum and rhodium or other suitable metallic material capable of withstanding the high temperatures of molten glass and of corrosion resistant characteristics.

Each bushing is embraced by refractory insulation 44 supported by a metal casing 46 secured to the forehearth construction 12 in any suitable manner. The floor or tip section 48 of the feeder is fashioned with a group of depending projections or tips 50 each tip being tubular and providing an orifice through which flows a stream 19 of glass.

The chamber 52 defined by the side walls 40 and end walls 41 of the feeder is preferably of greater depth than its width although the disposition of conditioning heating means and/or the construction of the side walls to improve the capacity of the bushing may reduce the desirability of maintaining a particular width to depth ratio. In any event, the bushing should have sufficient capacity in which the glass may be given a thermal treatment after entry from the forehearth channel but before reaching the floor or bottom wall 48. Extending lengthwise in the upper region of the chamber 52 in the stream feeder or bushing is a means 56 for heating the glass in the feeder to further condition it. The heater member 56 is preferably in the form of a screen or strip having perforations 58 to accommodate glass flow therethrough. In addition to heating the glass to condition the glass and remove undesirable nonuniformities therein that have come in with the glass from the forehearth, the heater screen 56 may be utilized to selectively heat different areas or cross sections of the glass flowing down through the bushing 18 to increase or decrease viscosity so that a substantially equal velocity gradient line may be established for the glass flow just above the bottom wall of the bushing. As a further means for establishing the equal velocity gradient lines the screen or strip 56 may be utilized to mechanically divert the flow lines of the glass in the feeder to establish the equal velocity desired.

It will be noted that perforations 59 at the edge of the screen 56 and adjacent to the bushing walls 40 are preferably sufficiently large to accommodate the flow of air out of the bushing when the bushing is initially being filled with molten glass. That is, the air bubble in the bushing which occurs when glass flows into the bushing initially and seals the orificed openings 50 will be divided by the screen and rise along the converging sidewalls and exit through the restricted flow passage in one or two large bubbles to avoid the retention of local bubble areas in corners or pockets that will upset the thermal conditions within the bushings. The screen 56 and the sidewalls 40 cooperate in accomplishing the release of air in the least disruptive fashion possible and avoid the possibility of the retention of pockets of air as occurred in previous bushing structures. The converging side walls 40 afford no opportunity to have stagnant areas of glass that remain in a heated condition for an overlong period and acquire undesirable characteristics. The heater member 56 cooperates in this aim.

While the heater member 56 is illustrated of V-shaped configuration, it is to be understood that other configurations of heater strip or mechanical flow diverting means may be used if desired. The heater member 56 has at its upper region flanges 60 joined with the sidewalls 40 of the bushing. Each end wall 41 of a bushing may be fashioned with an integral terminal or terminal lug 62 preferably of uniform thickness throughout its height. Current is supplied to each terminal through a bus bar 64 connected with a current supply of comparatively high amperage and low voltage.

Each bus bar 64 is preferably connected with the adjacent terminal 62 by adjustable means (not shown) to adjust the region of connection of the bus bar with the terminal to control current distribution through the walls of the bushing and the heater strip 56. The glass in each bushing is preferably elevated in temperature by current flow through the heater member or strip 56 to thermally treat the glass in a bushing. The glass in the bushing may be increased above the temperature of the glass in the forehearth but the temperature of the glass in the bushing should not exceed the maximum temperature of the melt in the furnace 10 as "reboiling" will occur.

In prior installations wherein bushings receive glass from a forehearth, it has been conventional practice to flow the glass from the forehearth into a bushing through an opening in a flow block of approximately the same size and shape as the cross-sectional area of the bushing. According to the recent developments discussed hereinbefore the glass passage 70 in the flow block 72 is narrow compared to the width of the bushing and the width of flow block passages heretofore used in conjunction with bushings. Therefore, an erosion of the refractory forming the sides of the passage 70 has occurred, particularly along the bottom edges thereof. This problem is avoided in the present invention since the side and end walls define a top opening of the bushing 18 which is of substantially the same size as the flow passage from the forehearth. Thus the bottom edge of the flow passage 70 is in effect provided with a platinum alloy edging which prevents erosion thereof.

In the embodiment illustrated in FIGURE 2 the flow block 72 is fashioned of high temperature resistant refractory and the narrow glass passage 70 in the flow block is substantially the same length as the bushing. With the comparatively narrow throat or glass passage through which glass from the forehearth channel flows into a bushing, the adjacent refractory of the block 72 serves to thermally isolate or mask the bushing from the forehearth. By reason of the flow block 72 substantially covering the bushing except for the narrow passage 70 as shown in the drawings, radiant energy or heat from the glass in the bushing is substantially prevented from being transmitted from a bushing to the forehearth and/or thence to adjacent bushings.

Through this arrangement each bushing is thermally isolated whereby the characteristics of the glass in a bushing are substantially independent of the characteristics of the glass in the forehearth thereby enabling accurate control of the characteristics of the glass in each bushing by the means illustrated herein independently of other bushings. In installations such as that shown in FIGURE 2 where the glass is subjected to thermal treatment by substantially increasing the temperature of the glass by electric energy passing through the heater strip, transmission of the radiant energy to the glass in the forehearth is substantially prevented by the restriction afforded by the flow passage 70.

The glass flow passage 70 is of a width to provide for flow of glass into a bushing preferably slightly in excess of the rate of delivery of the glass by way of the streams through the orificed projections 50 so as to maintain the bushing filled with glass at all times. Through the provision of the restricted passage 70, the glass moving from the forehearth 12 through the narrow passage 70 into the bushing flows at a rate which assists in preventing transfer of heat from the bushing into the glass in the forehearth.

The restricted passage in the flow block 72 likewise functions to prevent transmission of temperature variations in the forehearth to a bushing. Thus, through the provision of the restricted flow channel 70 temperature upsets in the glass in the forehearth do not appreciably affect the characteristics of the glass in each of the operating bushings. If a bushing is taken out of service, variations in temperature of the glass in the forehearth do not appreciably affect the glass in the operating bushings.

While a forehearth-bushing arrangement has just been discussed which utilizes a restricted passage between the forehearth and the bushing it is to be recognized that in the event that other means for preventing thermal interaction are utilized so that the passage may be enlarged, even up to the width of the forehearth channel 14, that it is still desirable to increase the production of filaments or fibers from a single feeder station. In order to do this it is necessary to enlarge the bottom wall or tip section area of a single feeder station by providing one or more additional tip section areas 48a and 48b as illustrated in FIGURE 2. The floor section or bottom wall of the bushing will still be larger than the flow passage from the forehearth channel to the bushing. Thus there is still a relative restriction in flow when the areas of the flow passage and the tip section are compared. Therefore, the provision of bushing construction and heat treatment details discussed hereinbefore with respect to the narrow flow passage are as applicable in a multi-tip section bushing just discussed.

In the past the increase in production of a single feeder station has been limited by the area of the bottom wall of th bushing which can be constructed without sagging occurring during operation. There is illustrated in FIGURE 2 a method of overcoming this problem which includes dividing the bottom wall of the bushing into a plurality of orificed carrying areas and adapting the bushing to receive mechanical support between the orificed carrying areas to prevent sagging. A refractory support 44a may be placed beneath the center of the bottom wall 48 to afford support therefor. To prevent an accumulation or concentration of heat in this area which would disrupt the uniform pulling rates desired, a heat exchange element in the form of a fluid carrying passage or conduit 44b is associated with the refractory 44a providing support for the bottom floor 48. By regulating the flow of a heat exchange fluid through conduit 44b the temperature along the center line or support area of the bushing 18 may be regulated to prevent interference with the filament attenuation process. The conduit 44b may be completely buried in or surrounded by refractory support means 44a or may be partially exposed depending upon the heat exchange characteristics desired.

It will be noted in a preferred embodiment as illustrated in FIGURE 2 that the converging side walls 40 have been divided into lower portions 40a which may extend upwardly from the bottom wall 48 at a converging angle with respect to each other and upper portions 40b which may converge more sharply together than lower portions 40a in order to define a top opening which is of substantially the same size as flow passage 70. By providing two different degrees of convergence the capacity of the bushing 18 is enlarged and thus enables a longer residence time of the glass in the bushing. This affords more opportunity to heat treat or condition the glass and also assists in establishing the desired equal velocity gradient lines horizontal to the bottom wall 48 that are desired.

Figure 3:
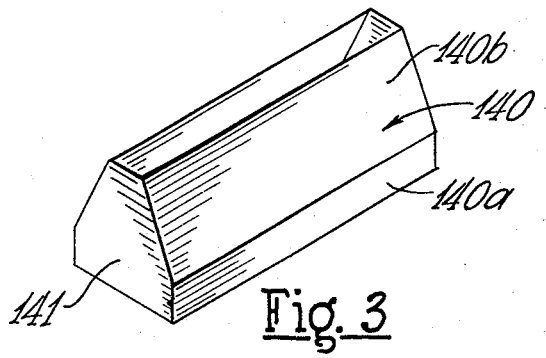
FIGURE 3 is a second embodiment of apparatus illustrating the teachings of this invention.

Referring to FIGURE 3 there is illustrated a view in perspective of a second embodiment of a bushing chamber in which capacity is enlarged by extending a lower portion 140a of the side walls 140 vertically upward and then converging the upper portion of the side walls 140b together to define the desired size top opening. It will be noted that in the embodiment illustrated in FIGURE 3 as was the case for the embodiment illustrated in FIGURE 2 the bottom wall is of the same length as the length of the top opening so that end walls 141 extend vertically upward from the bottom wall to the top opening.

Figure 4:
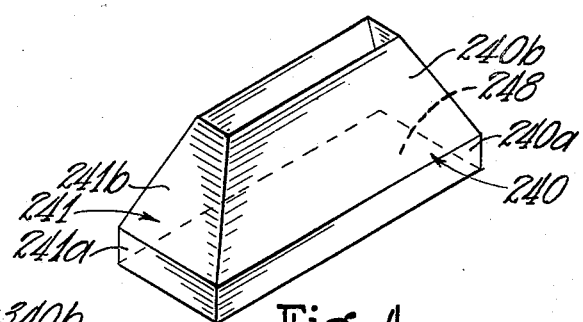
FIGURE 4 is a third embodiment of apparatus illustrating the teachings of this invention.

Referring to FIGURE 4 there is illustrated still another embodiment in which the tip section area 248 of the bottom wall is both wider and longer than the flow passage for receiving glass from the forehearth. Thus not only do side walls 240 converge toward the top opening but end walls 241 also converge toward the side opening. The capacity of the feeder or bushing may be increased by having lower portions 240a, 241a which either extend vertically or converge at a lesser angle than upper portions 240b, 241b.

Figure 5:
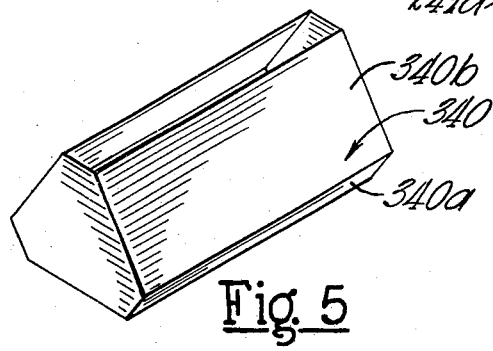
FIGURE 5 illustrates a fourth embodiment of apparatus illustrating the teachings of this invention.

Referring to FIGURE 5 there is illustrated still another embodiment of the teachings of this invention having side walls 340 that converge in their overall effect but which utilizes diverging lower portions 340a and more sharply converging upper portions 340b to provide a greater capacity for the bushing or feeder.

Figure 6:
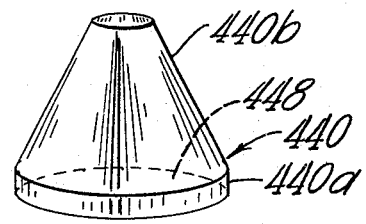
FIGURE 6 illustrates a fifth embodiment of apparatus illustrating the teachings of this invention.

Referring to FIGURE 6 there is illustrated an embodiment of this invention in which the tip section area 448 is circular. Side wall means 440 converge from the bottom wall or tip section 448 to define a top opening which may be of substantially the same size as a flow passage from the forehearth channel. The side wall means 440a generally thus defines a truncated conical section as indicated at 440b. However, if it is desirable to increase the capacity of the bushing then a lower portion 440a of the side wall means 440 may be extended vertically upward or even diverged outwardly to increase the capacity.

The invention thus particularly improves the processing and conditioning of glass for forming fine continuous attenuated filaments as it enables the delivery of streams of more uniform size from the several bushings by reason of the high degree of thermal stability and uniformity of desired characteristics and glass flow above the bottom wall which can be maintained in a feeder or bushing.

It is apparent that within the scope of the invention modifications and different arrangements may be made other than is herein disclosed and the present disclosure is illustrative merely the invention comprehending all variations thereof.

I claim:

1. Apparatus of the character disclosed, comprising a stream feeder for use adjacent a flow passage formed in a channel means to deliver a supply of heat-softened glass from said channel means to said feeder, said stream feeder having a bottom wall with orifices formed therein through which streams of material are discharged, said bottom wall having an area in excess of the area defined by the flow passage, wall means extending upwardly from said bottom wall, said wall means having upper portions that converge toward each other at an angle to define a top opening for said stream feeder having substantially the same dimensions as a bottom opening of a flow passage formed in a channel means.

2. Apparatus as defined in claim 1 which further includes means spaced from the bottom wall of said feeder for heat-treating said glass to condition said glass and to control the viscosity of said glass to provide substantially horizontal equal velocity gradient lines above said bottom wall.

3. Apparatus as defined in claim 2 in which said spaced means comprises a heater screen having perforations formed therein to guide air flow out of said feeder as it fills with glass and to guide glass flow in said feeder after filling.

4. Apparatus as defined in claim 1 in which said bottom wall is rectangular and in which said wall means includes end walls extending vertically upward and side walls that converge toward each other to define said top opening.

5. Apparatus as defined in claim 4 in which said side walls have lower portions that converge and upper portions with a greater degree of convergence to provide a larger capacity for said feeder.

6. Apparatus as defined in claim 4 in which said side walls have lower portions that extend vertically and upper portions that converge toward each other.

7. Apparatus as defined in claim 4 in which said side walls have lower portions that diverge away and upper portions that converge toward each other.

8. Apparatus as defined in claim 1 in which said wall means has vertically extending lower portions that join with said converging upper portions.

9. Apparatus as defined in claim 1 in which said bottom wall is rectangular and in which said wall means includes end walls and side walls, all converging toward said top opening.

10. Apparatus as defined in claim 1 in which said bottom wall is circular and in which said wall means includes an upper conical portion which converges toward said top opening.

11. Apparatus as defined in claim 10 in which said wall means includes a lower portion that extends vertically upward from said bottom wall and joins with said conical upper portion.

12. Apparatus of the character disclosed, in combination, means having a channel containing a supply of heat-softened glass, a stream feeder disposed adjacent said means, a member disposed adjacent the stream feeder providing a floor portion for said means, said member having a restricted flow passage with bottom and side edges through which glass flows from said channel so that said member may act as a thermal mask to retard heat transfer between the stream feeder and the channel, said stream feeder having side walls and a bottom wall with orifices formed therein through which streams of material are discharged, said bottom wall being wider than said restricted flow passage, said side walls converging from said bottom wall to said bottom side edges of said restricted flow passage to define a top opening for said feeder having substantially the same width dimension as said flow passage, said flow passage being of a size having a glass flow capacity substantially equal to but not less than the glass flow capacity of the orifices in the bottom wall of said feeder.

13. Apparatus as defined in claim 12 in which said feeder has end walls extending vertically upwardly from said bottom wall to said bottom end edges of said flow passage.

14. Apparatus as defined in claim 12 in which said side walls have lower portions and upper portions extending from said lower portions that converge toward said top opening to provide more capacity in said feeder to enable a longer residence time for molten glass therein.

15. Apparatus as defined in claim 12 which further includes means spaced from said bottom wall for heat-treating said glass to condition said glass and to control the viscosity of said glass to provide substantially horizontal equal velocity gradient lines above said bottom wall.

16. Apparatus as defined in claim 15 in which said spaced means comprises a heater screen having perforations formed therein to guide air flow out of said feeder as it fills with glass and to guide glass flow in said feeder after filling.

17. Apparatus as defined in claim 12 in which said bottom wall is rectangular and which further includes end walls converging toward each other to said bottom end edges of said restricted flow passage.

18. Apparatus as defined in claim 12 in which said bottom wall is circular and in which said side walls form a substantially conical member which is truncated at said restricted flow passage.

19. Apparatus for processing heat-softened glass into glass fibers including a forehearth channel means, a stream feeder arranged along said forehearth, a restricted flow passage means between said forehearth channel and said stream feeder to impede transfer of heat energy between said channel and said feeder, said stream feeder having an orifice carrying bottom wall larger than said restricted flow passage means and side walls which converge toward each other from said bottom wall to define a top opening of substantially the same size as said restricted flow passage means to enable the release of air from said feeder as it fills with glass without disrupting the conditioning of said glass and to preclude the establishment of disruptive eddy currents and stagnant pockets of heat-softened glass in said feeder, and means for attenuating streams of said heat-softened glass issuing from orifices in said bottom wall of said feeder into glass fibers.

References Cited

UNITED STATES PATENTS 3,082,614  3/1963  Denniston _____ 65—2
3,406,021  10/1968  Day et al. _____ 65—2 X S. LEON BASHORE, Primary Examiner ROBERT L. LINDSAY JR., Assistant Examiner U.S. Cl. X.R.
65—2, 12